UNITED STATES PATENT OFFICE.

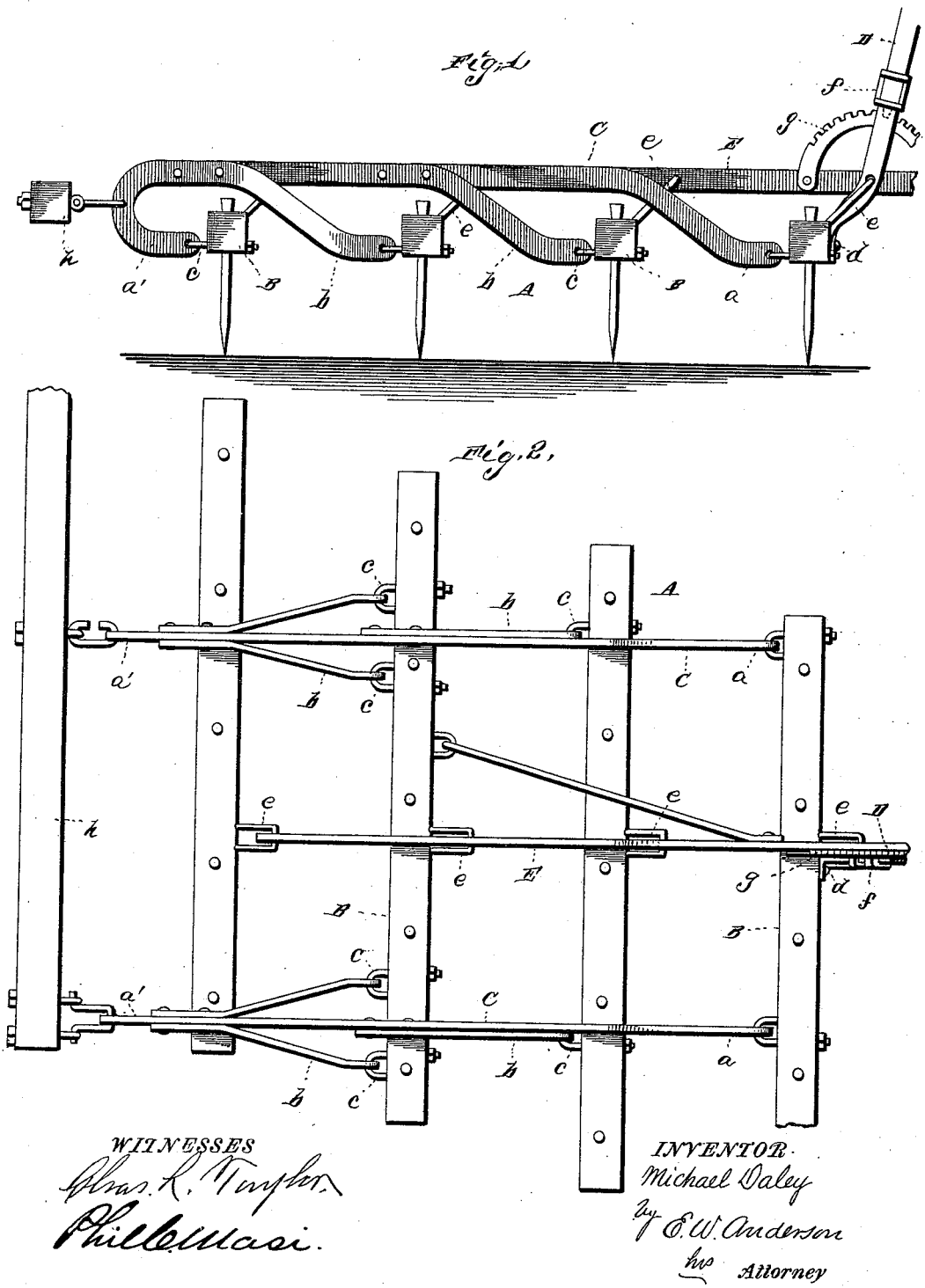

MICHAEL DALEY, OF DE KALB, ILLINOIS, ASSIGNOR TO THE DALEY MANUFACTURING COMPANY, OF SAME PLACE.

HARROW.

SPECIFICATION forming part of Letters Patent No. 434,383, dated August 12, 1890.

Application filed March 31, 1890. Serial No. 346,096. (No model.)

*To all whom it may concern:*

Be it known that I, MICHAEL DALEY, a citizen of the United States, and a resident of De Kalb, in the county of De Kalb and State of Illinois, have invented certain new and useful Improvements in Harrows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view, and Fig. 2 is a top plan view.

This invention relates to certain improvements in harrows; and it consists of the novel construction and combination of parts, as will hereinafter appear from the following description and accompanying drawings.

In the drawings the harrow is shown as consisting of sections, A A being the transverse tooth-beams, and B B the harrow-teeth, which are not different in any essential particulars from the ordinary form of beam and tooth.

C C are the connecting-bars between said tooth-beams, which also serve as runners. The bars or runners C C, which may be two or more, are connected to the front side of each tooth-beam A. This connection is effected by curving or extending downward and rearward the rear ends of the runners or bars C C, as at $a$, and their forward ends, as at $a'$, and providing said runners or bars with arms and extended as said ends $b$ similarly curved or extended as said ends of said runners, and by means of staples $c$ connected to the beams A. The staples $c$ have extended straight portions passed through the beams A near their lower forward corner edges from front to rear, and are fitted with nuts upon their rear screw-threaded ends, the curved or eye portions of said staples engaging or passing through apertures in the rear ends of the arms $b$ and the rearward curved ends of the bars or runners C C, and engaging holes in the front sides of said beams. By this arrangement the bars or runners C C, with their arms $b$, are enabled when the tooth-beams receive an axial movement, as is the case in taking the teeth out of the ground or disposing them horizontally, to rest and run along the ground with said beams, resting upon the rearward curved ends of said runners and arms. This, it will be seen, provides for the ready conversion of the harrow into means for its own transference from place to place in the field and at the same time elevates the connecting-bars C bodily, so as to prevent accumulating trash or refuse matter when the harrow is transferred; also by means of this arrangement of parts the application of the draft is effected at the lowest possible point, low down near the harrow-teeth, thus preventing liability of the latter springing or jumping out of the ground, as where the draft is applied higher upon the harrow. The harrow-sections are also permitted to be arranged as shown, so that the teeth of successive beams will be out of alignment with the teeth of the preceding beams, as required to effect the complete harrowing of the ground.

D is the lever for effecting the axial adjustment or movement of the tooth-beams A, which is connected at its lower end by a bolt $d$, passed therethrough and through the rear-end tooth-beam, and fitted or held in place by a nut.

E is the shifting-bar, which is connected to the several tooth-beams A A by means of staples or bails $e$, projecting upwardly and rearwardly from the upper rear corner edge of said beams and passing through or engaging said shifting-bar, one of said staples or bails also passing through the lever D, pivoting it to the shifting-bar. Thus while the lever D can, by the detachment thereof from its fastening-bolt $d$, be folded down upon the tooth-beams, as $d$, desirable in shipping the harrows, yet by means of the bail or staples $e$, passing through it, it will be prevented from displacement.

The lever D is provided with a slide $f$, having a tooth, and the shifting-bar E has a segmental rack $g$, engaged by said tooth, to effect the adjustment of the beams and their teeth at any desired angle to the ground.

The harrow-sections are connected together in the usual way by the draft-bar $h$ common to and linked to said sections.

Having described this invention, what I claim, and desire to secure by Letters Patent, is—

1. The harrow having its tooth-beams connected together by bars adapted to serve as runners or carry said beams when transferred from place to place, and having their ends connected to the front side of and standing about in the same plane with the lower surfaces of the said beams, ranging above said beams, substantially as specified.

2. In a harrow, the combination, with its tooth-beams, of the bars curved or extended downward and rearward at their ends, and provided with arms similarly curved or extended, the lower ends of said bars and arms connecting with said tooth-beams at their front sides near the lower edges, substantially as set forth.

In testimony whereof I affix my signature in presence of two witnesses.

MICHAEL DALEY.

Witnesses:
C. H. BRADLEY,
D. F. WILLIAMS.